(12) United States Patent
Oda

(10) Patent No.: US 9,951,548 B2
(45) Date of Patent: Apr. 24, 2018

(54) SYSTEM ABLE TO CONTROL SPEED OF DOOR

(71) Applicant: FANUC CORPORATION, Minamitsuru-gun, Yamanashi (JP)

(72) Inventor: Masaru Oda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/684,718

(22) Filed: Apr. 13, 2015

(65) Prior Publication Data

US 2015/0308176 A1    Oct. 29, 2015

(30) Foreign Application Priority Data

Apr. 23, 2014  (JP) .................... 2014-089086

(51) Int. Cl.
*E05F 15/40* (2015.01)
*B23Q 1/01* (2006.01)
*E05F 15/60* (2015.01)

(52) U.S. Cl.
CPC .............. *E05F 15/40* (2015.01); *B23Q 1/012* (2013.01); *E05F 15/60* (2015.01); *E05Y 2400/324* (2013.01); *E05Y 2400/354* (2013.01); *E05Y 2400/36* (2013.01); *E05Y 2400/53* (2013.01); *E05Y 2900/132* (2013.01); *E05Y 2900/608* (2013.01)

(58) Field of Classification Search
CPC ................ B23Q 1/012; B23Q 11/0078; B23Q 11/0082; B23Q 11/0085; B23Q 11/0089; B23Q 11/0092; B23Q 11/08; B23Q 17/2438
See application file for complete search history.

(56) References Cited

U.S. PATENT DOCUMENTS 3,208,127 A * 9/1965 Witzig et al. .......... B23Q 11/00
192/129 A
4,677,733 A * 7/1987 Andersson ......... B23Q 11/0092
144/1.1

(Continued)

FOREIGN PATENT DOCUMENTS

CN    101180444 A    5/2008
CN    202990695 U    6/2013

(Continued)

*Primary Examiner* — Jerry E Redman
*Assistant Examiner* — Catherine A Kelly
(74) *Attorney, Agent, or Firm* — RatnerPrestia

(57) ABSTRACT

A system which can reliably prevent a worker from being caught in a door which is provided on a work machine. The system comprises a work machine which has an operable door, a door drive part which makes the door operate, a door controller which controls the door drive part, a robot which is provided so that at least part can enter and retract from the inside of the work machine when opening the door, and an entry detection part which detects a possibility of a person entering a predetermined zone which includes a range of operation of the robot. The door controller changes a command value to the door drive part which determines the speed of movement of the door when the entry detection part detects that possibility to a second command value which makes the speed of movement decrease.

5 Claims, 8 Drawing Sheets

(56) References Cited

U.S. PATENT DOCUMENTS

| | | | | |
|---|---|---|---|---|
| 5,121,539 | A * | 6/1992 | Klingel | B23P 13/00 |
| | | | | 29/34 B |
| 6,708,956 | B1 * | 3/2004 | Mangelsen | B23Q 11/08 |
| | | | | 256/24 |
| 6,748,998 | B2 * | 6/2004 | Yamagami | B23Q 11/08 |
| | | | | 160/117 |
| 6,752,573 | B2 * | 6/2004 | Haller | B23Q 1/012 |
| | | | | 409/134 |
| 6,949,055 | B2 * | 9/2005 | Ferrari | B23Q 1/012 |
| | | | | 409/202 |
| 8,729,837 | B2 * | 5/2014 | Tandrow | G05B 19/19 |
| | | | | 318/268 |
| 2006/0108960 | A1 | 5/2006 | Tanaka et al. | |
| 2008/0084300 | A1 | 4/2008 | Albers et al. | |
| 2009/0072631 | A1 | 3/2009 | Iida et al. | |
| 2013/0203572 | A1 * | 8/2013 | Denkmeier | B21D 5/0254 |
| | | | | 483/58 |

FOREIGN PATENT DOCUMENTS

| | | |
|---|---|---|
| DE | 102009048863 A1 | 4/2010 |
| DE | 102010016727 A1 | 1/2011 |
| EP | 1918629 A2 | 5/2008 |
| EP | 2165801 A2 | 3/2010 |
| EP | 1911553 B1 | 4/2014 |
| JP | 59124540 | 7/1984 |
| JP | 05-074744 | 3/1993 |
| JP | 05074744 U | 10/1993 |
| JP | 08085037 A | 4/1996 |
| JP | 2007283450 | 11/2007 |
| JP | 2008-207270 | 9/2008 |
| JP | 2011125975 A | 6/2011 |
| JP | 2013193152 A | 9/2013 |
| WO | 2007010795 A1 | 1/2007 |

\* cited by examiner

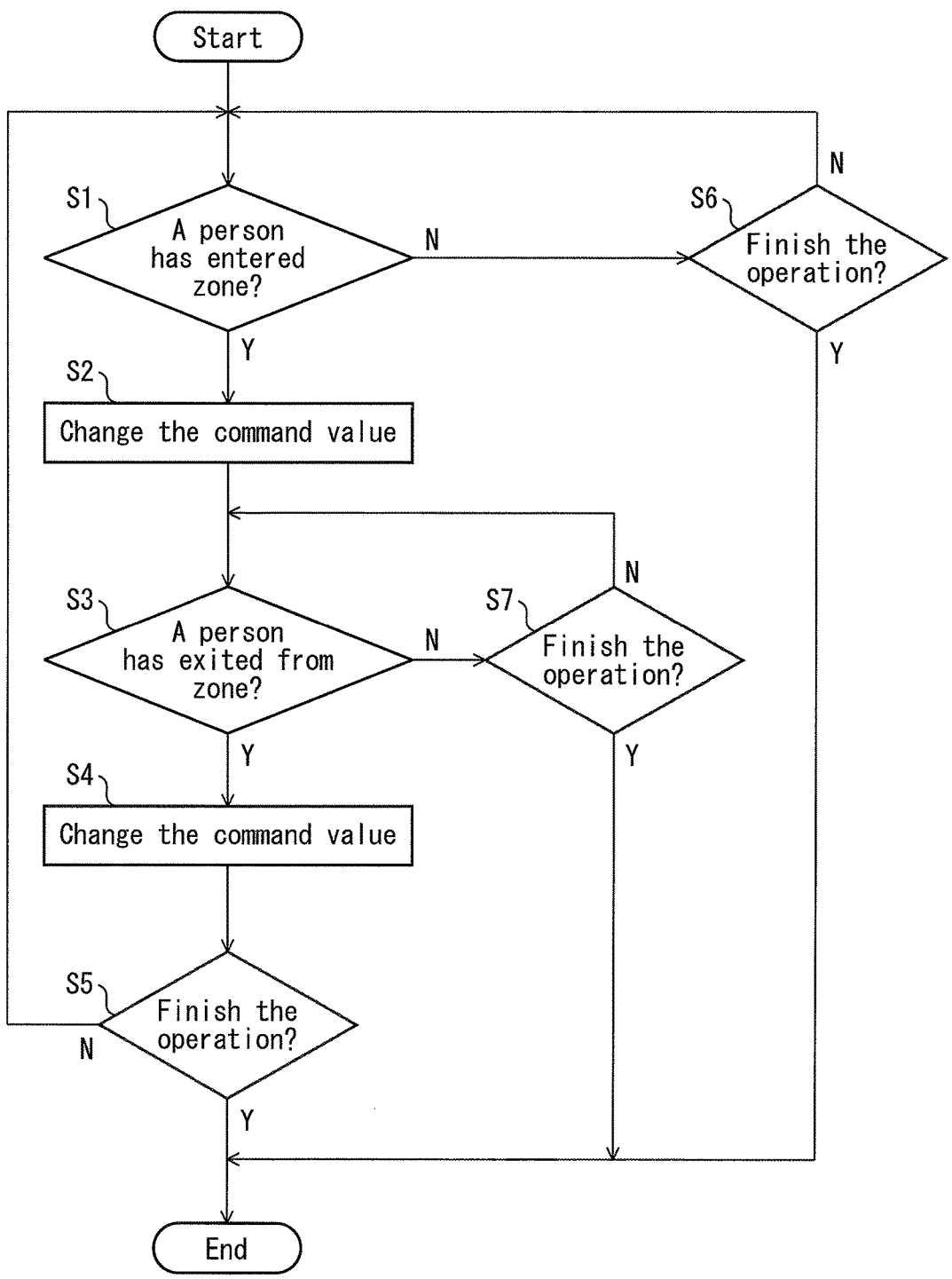

SYSTEM ABLE TO CONTROL SPEED OF DOOR

BACKGROUND OF THE INVENTION

1. Field of the Invention

The invention relates to a system able to control the speed of a door.

2. Description of the Related Art

Known in the art is a processing system which is provided with an automatically operable door (for example, Japanese Utility Model Publication No. 5-74744U and Japanese Patent Publication No. 2008-207270A).

Most industries use systems which are provided with work machines which have operable doors and can perform specific work at the insides when the doors are closed (for example processing machines) and robots which load and unload objects (for example workpieces or tools) in the work machines when the doors are opened. In such a system, it is necessary to reliably prevent a worker from ending up being caught in the door which is provided at the work machine.

SUMMARY OF THE INVENTION

In one aspect of the invention, the system comprises a work machine which includes an openable door; a door drive part which opens and closes the door; a door controller which controls the door drive part; a robot which is provided so that at least a part of the robot can enter and retract from the inside of the work machine when the door is opened; and an entry detection part which detects a possibility of a person entering a predetermined zone which includes a motion range of the robot. The door controller changes a command value, which is to be sent to the door drive part and which determines the speed of movement of the door, to a second command value for decreasing the speed of movement, when the entry detection part detects the above possibility.

The door drive part may include an electric motor. The door controller may change a torque limit value, which determines a maximum torque of the electric motor, to a second torque limit value for decreasing the maximum torque, when the entry detection part detects the above possibility. The electric motor may be a servo motor.

The system may further comprise a fence which defines the zone, and at least a part of which can be opened and closed. The entry detection part may include a switch which detects whether at least a part of the fence has been opened. The door controller may change the command value to the second command value when the switch detects that at least a part of the fence has been opened.

The entry detection part may include a noncontact sensor which detects whether an object crossing a boundary line which defines the zone. The door controller may changes the command value to the second command value when the noncontact sensor detects that the object has crossed the boundary line.

BRIEF DESCRIPTION OF THE DRAWINGS

These and other objects, features, and advantages of the invention will become clearer with reference to the detailed description of illustrative embodiments of the invention which are shown in the attached drawings, wherein

FIG. 8 is a flow chart which shows one example of the operation flow of a system according to the invention.

DESCRIPTION OF THE PREFERRED EMBODIMENTS

Figure 1:
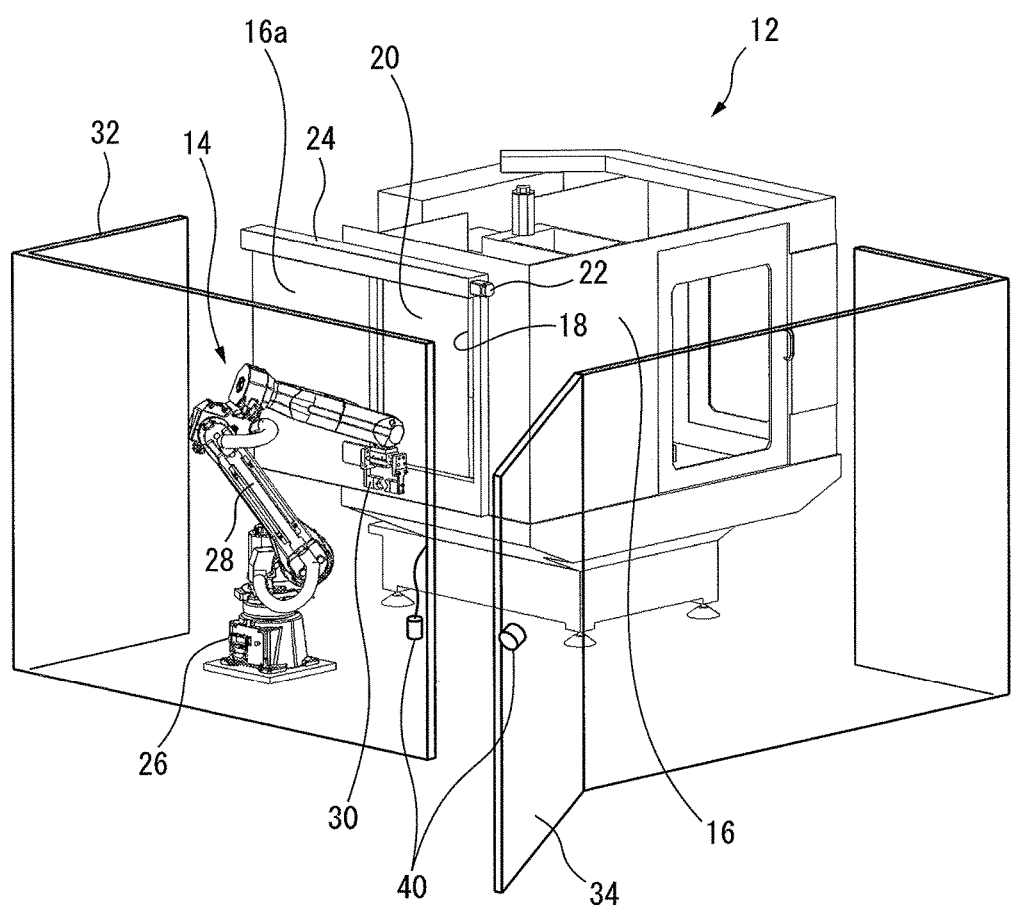
FIG. 1 is a perspective view of a system according to an embodiment of the invention.
Figure 2:
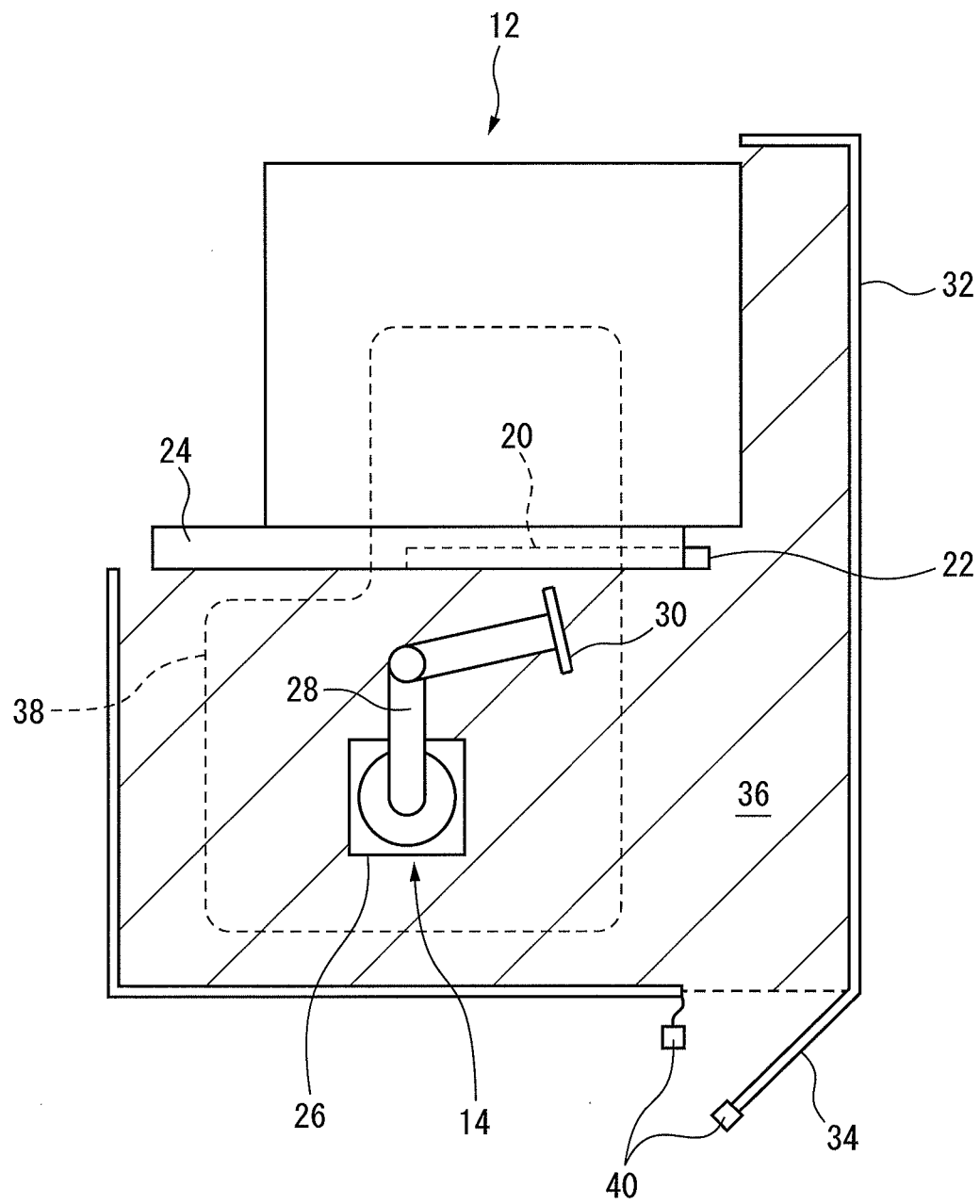
FIG. 2 is a schematic view of the system shown in FIG. 1 as seen from above.

Below, embodiments of the invention will be explained in detail based on the drawings. First, referring to FIG. 1 and FIG. 2, a system 10 according to an embodiment of the invention will be explained. The system 10 includes a processing machine 12 as one example of a work machine; and a robot 14 arranged to adjoin the processing machine 12.

The processing machine 12 is for example a machine tool for machining a workpiece, and includes a cover 16 surrounding the inside of the processing machine 12 so as to prevent cutting fluid, etc., from scattering to the outside. A substantially rectangular opening 18 is provided at an opening surface 16a of the cover 16 which faces the robot 14. The processing machine 12 includes a door 20 which can move along the opening surface 16a so as to close the opening 18.

The door 20 is moved by a servo motor 22, which is an example of an electric motor, so as to open or close the opening 18. An open/close mechanism 24, which is comprised of e.g. a ball screw mechanism, is mechanically connected to an output shaft (not shown) of the servo motor 22. The door 20 is mechanically connected to the open/close mechanism 24. The servo motor 22 moves the door 20 to open or close via the open/close mechanism 24 at a speed in accordance with the rotation of the output shaft. Thus, in the present embodiment, the servo motor 22 functions as a door drive part which opens and closes the door 20.

The robot 14 is e.g. a vertical multi-articulated robot, and includes a base 26 fixed to a floor; a robot arm 28 connected to the base 26 to be able to swivel; and a hand 30 provided at the distal end of the robot arm 28. The hand 30 grips a workpiece or tool, and is placed into or retracted from the inside of the processing machine 12 through the opening 18 by the action of the robot arm 28. Due to this configuration, it is possible to automatically change the workpiece to be processed and/or a tool which is to be attached to the processing machine 12, etc.

The system 10 includes a fence 32 provided so as to surround the robot 14. The fence 32 includes a fence door 34 for enabling a part of the fence 32 to be opened and closed, and defines a zone 36 shown by hatching in FIG. 2 together with the processing machine 12. The zone 36 is defined to include a part of a motion range 38 of the robot 14. More specifically, the zone 36 is defined so as to include the part of the motion range 38 of the robot 14 other than a part of the motion range 38 positioned at the inside of the processing machine 12 (inside from the door 20).

The fence door 34 is openably attached to the fence 32. A user can enter the zone 36 from outside of the fence 32 via the fence door 34. A switch 40 is provided at the fence door 34. The switch 40 detects whether the fence door 34 is opened. Specifically, the switch 40 is electrically coupled to be turned ON when the fence door 34 is closed, while it is electrically decoupled to be turned OFF when the user opens the fence door 34. The switch 40 may be turned ON and OFF by the user manually coupling/decoupling the switch 40 when opening and closing the fence door 34. Alternatively, the switch 40 may be turned ON and OFF automatically when opening and closing the fence door 34.

Next, referring to FIG. 3, a block diagram of the system 10 will be explained. The system 10 includes a processing machine controller 44 and a robot controller 48. The processing machine controller 44 sends a control signal to a processing machine actuator 42, except for the servo motor 22 provided at the processing machine 12, so as to control the operation of the processing machine 12. The robot controller 48 sends a control signal to a robot actuator 46 provided at the robot 14 so as to control the operation of the robot 14. The processing machine controller 44 and the robot controller 48 are connected to be able to communicate with each other.

The robot actuator 46 includes e.g. servo motors built in the robot arm 28 and hand 30 of the robot 14. The robot controller 48 includes a CPU; a memory comprised of a RAM etc.; and a servo amplifier. The robot controller 48 sends a command to the robot actuator 46 so as to operate the robot arm 28 and hand 30.

Specifically, the robot controller 48 operates the robot arm 28 so as to enter the inside of the processing machine 12 from the opening 18, and operates the hand 30 to grip the workpiece or tool. Then, the robot controller 48 operates the robot arm 28 so as to remove the workpiece or tool gripped by the hand 30 to the outside of the processing machine 12. In this way, the robot 14 can automatically change a workpiece or tool, etc., from the processing machine 12.

The processing machine actuator 42 includes e.g. a servo motor built in a spindle of the processing machine 12. The processing machine controller 44 includes a CPU; a memory comprised of a RAM, etc.; and a servo amplifier. The processing machine controller 44 sends a command to the processing machine actuator 42 so as to operate the processing machine 12. Specifically, the processing machine controller 44 rotates the machine tool so as to process the workpiece set inside of the processing machine 12.

In the present embodiment, the processing machine controller 44 has a function of a door controller 50 which controls the servo motor 22 for driving the door 20. The memory built in the processing machine controller 44 pre-records a first command value which determines the speed of movement of the door 20. The first command value is sent to the servo motor 22 in order to move the door 20 to open/close at a first speed.

When opening and closing the door 20 at the first speed, the processing machine controller 44 reads out the first command value and transmits it to the servo motor 22. The servo motor 22 rotates the output shaft at a rotation speed in response to the first command value received from the processing machine controller 44, and moves the door 20 to open or close via the open/close mechanism 24 at the first speed.

The processing machine controller 44 is connected to the switch 40 so as to be able to communicate with the switch 40. When the fence door 34 provided at the fence 32 is opened, the switch 40 sends a signal for notifying opening of the fence door 34 to the processing machine controller 44. The processing machine controller 44 determines whether the user has entered the zone 36 based on the signal received from the switch 40.

Specific examples for determining entry of the user by the processing machine controller 44 will be explained below. As a first example, the system 10 may include an exit button for notifying the user's exit which is arranged at the outside of the fence 32. In this first example, the switch 40 transmits a first door opening signal to the processing machine controller 44, when the fence door 34 is opened after the system 10 receives an operation command from the user and the processing machine 12 starts to operate.

The processing machine controller 44 determines that a person has entered the zone 36 when receiving the first door opening signal, and changes the command value which is transmitted to the servo motor 22 in order to decrease the speed of movement of the door 20. Specifically, the processing machine controller 44 changes the command value for driving the servo motor 22 from the first command value to a second command value.

The second command value is transmitted to the servo motor 22 in order to move the door 20 at a second speed which is lower than the first speed. For example, the second command value is pre-recorded in the memory built in the processing machine controller 44.

The processing machine controller 44 transmits the second command value to the servo motor 22 when receiving the first door opening signal. The servo motor 22 moves the door 20 to open and close via the open/close mechanism 24 at the second speed in accordance with the second command value. In this way, after opening the fence door 34, the door 20 is opened/closed at a second speed lower than the first speed, which is applied before opening the fence door 34.

After that, if the user pushes the exit button arranged outside of the zone 36, the processing machine controller 44 receives a signal from the exit button and determines that the user has exited from the zone 36. Then, the processing machine controller 44 changes the command for driving the servo motor 22 from the second command value to the first command value again, and moves the door 20 to open/close at the first speed.

Alternatively, as a second example, the processing machine controller 44 may determine whether the user has entered the zone 36 based on the number of times the fence door 34 is opened. In this second example, the switch 40 transmits the first door opening signal to the processing machine controller 44, when the fence door 34 is opened for the first time after the system 10 receives the operation command from the user and the processing machine 12 start to operate.

The processing machine controller 44 determines that a person has entered the zone 36 when receiving the first door opening signal. Then, the processing machine controller 44 changes the command value for driving the servo motor 22 from the first command value to the second command value. Next, when the fence door 34 is closed, the switch 40 transmits a first door closing signal. When receiving the first door closing signal, the processing machine controller 44 determines that the user has closed the fence door 34.

After receiving the first door closing signal, the switch 40 transmits a second door opening signal to the processing machine controller 44 when the fence door 34 is opened the second time. When the fence door 34 is closed after receiving the second door opening signal, the switch 40 transmits a second door closing signal. When receiving the second door closing signal, the processing machine controller 44 determines that the user has exited from the zone 36.

Then, the processing machine controller 44 changes the command value for driving the servo motor 22 from the second command value to the first command value again. In this second example, the door 20 is moved to open/close at the second speed lower than the first speed from when the fence door 34 is opened the first time to when it is closed the second time.

Thus, in the present embodiment, the processing machine controller 44 determines whether the user has entered the zone 36 based on the door opening signal (and/or door closing signal) from the switch 40 provided at the fence door 34. Accordingly, the switch 40 functions as an entry detection part for detecting the possibility of a person entering the zone 36.

According to the present embodiment, the processing machine controller 44 detects the possibility of the user entering the zone 36 through the switch 40, and decreases the speed of movement of the door 20 when determining that there is the above possibility. Due to this configuration, it is possible to reliably avoid the danger of the user being caught in the door 20.

Further, according to the present embodiment, the fence 32 is used to define the zone 36, and the entry detection part for detecting the possibility of the user entering the zone 36 is configured by the switch 40. Due to this, it is possible to construct the system 10 more simply and cheaply, so the cost of manufacture of the system 10 can be decreased.

Note that, the processing machine controller 44 may decrease the torque limit value which determines the maximum torque of the servo motor 22 when detecting the possibility of the user having entered the zone 36 by the switch 40. Specifically, the processing machine controller 44 changes the torque limit value of the servo motor 22 from the first torque limit value to a second torque limit value smaller than the first torque limit value, when determining that the user has entered the zone 36 based on the door opening signal (and/or door closing signal) received from the switch 40.

Then, the processing machine controller 44 drives the servo motor 22 by the second torque limit value. The first torque limit value and second torque limit value may be pre-recorded in the memory built in the processing machine controller 44. According to this configuration, the processing machine controller 44 can decrease both the speed of the door 20 for closing and the force of the door 20 for closing, when there is a possibility that the user has entered the zone 36. Due to this, the safety of the user can be more effectively ensured.

Figure 3:
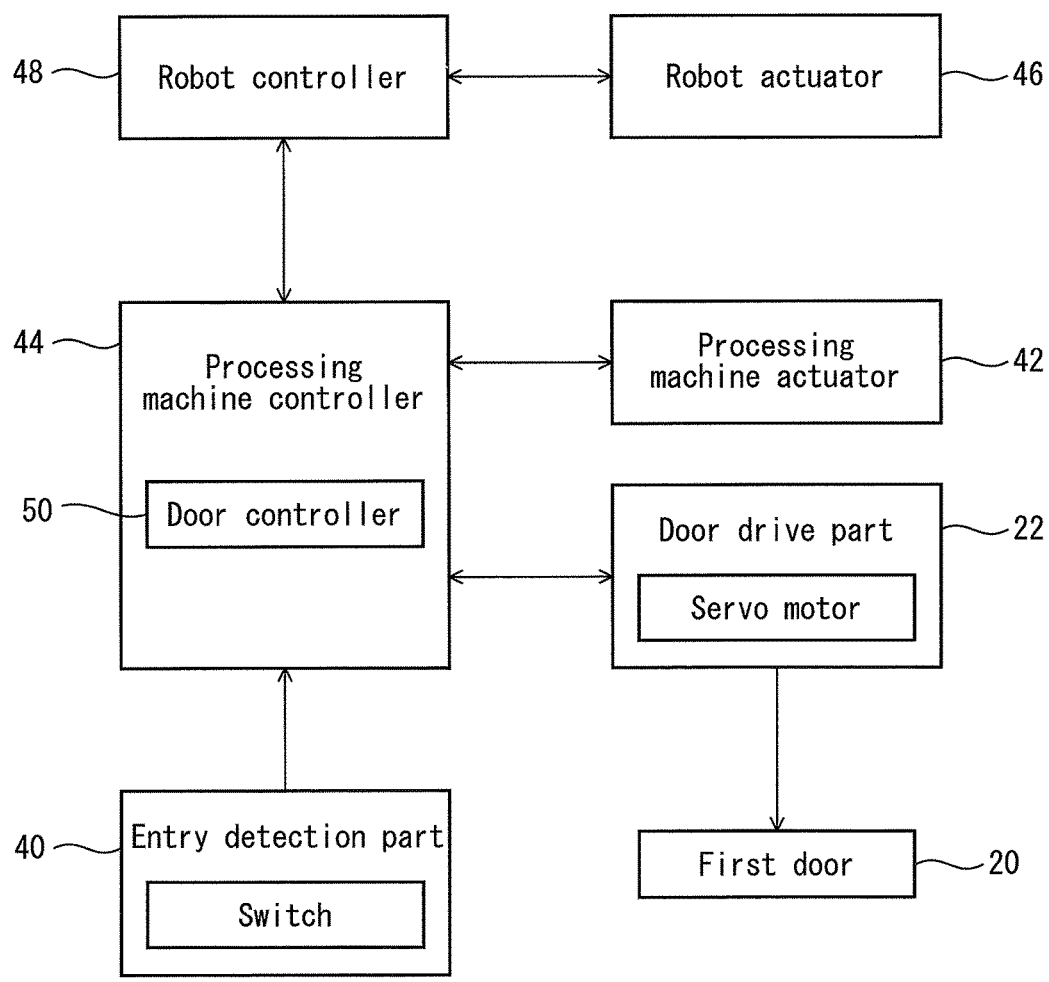
FIG. 3 is a block diagram of the system shown in FIG. 1.
Figure 4:
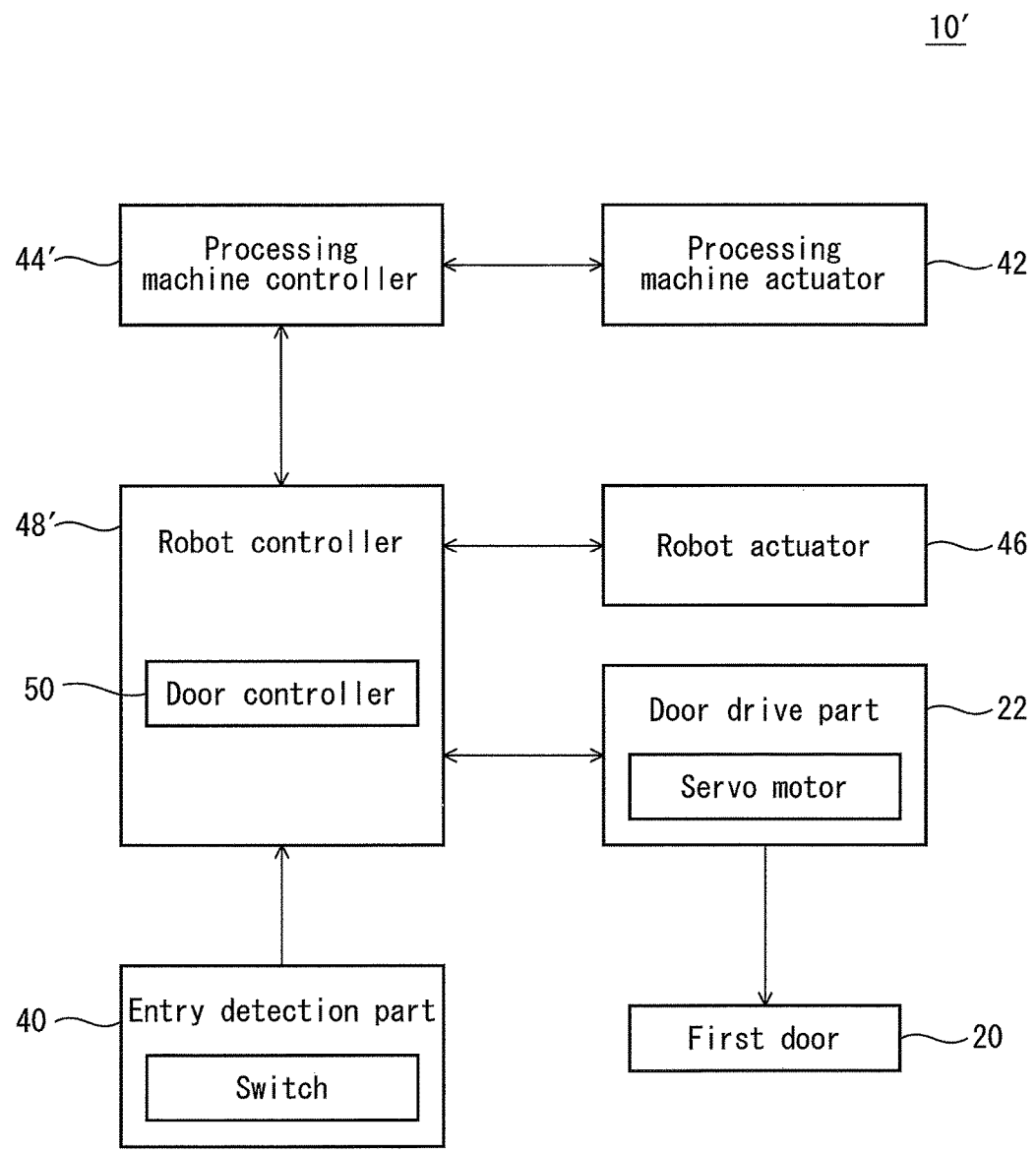
FIG. 4 is a block diagram of a system according to another embodiment of the invention.

Further, in the present embodiment, as shown in FIG. 3, the case where the processing machine controller 44 has the function of the door controller 50 was explained. However, the invention is not limited to this. The robot controller may have the function of the door controller. Such embodiment is shown in FIG. 4. In this system 10', the robot controller 48' has the function of the door controller 50 which controls the servo motor 22.

The robot controller 48' is electrically connected to the switch 40 and determines whether the user has entered the zone 36 based on the door opening signal (and/or door closing signal) received from the switch 40. When determining that the user has entered the zone 36, the robot controller 48' changes the command value of the servo motor 22 from the first command value to the second command value, whereby decreases the speed of the door 20 for opening/closing.

Figure 5:
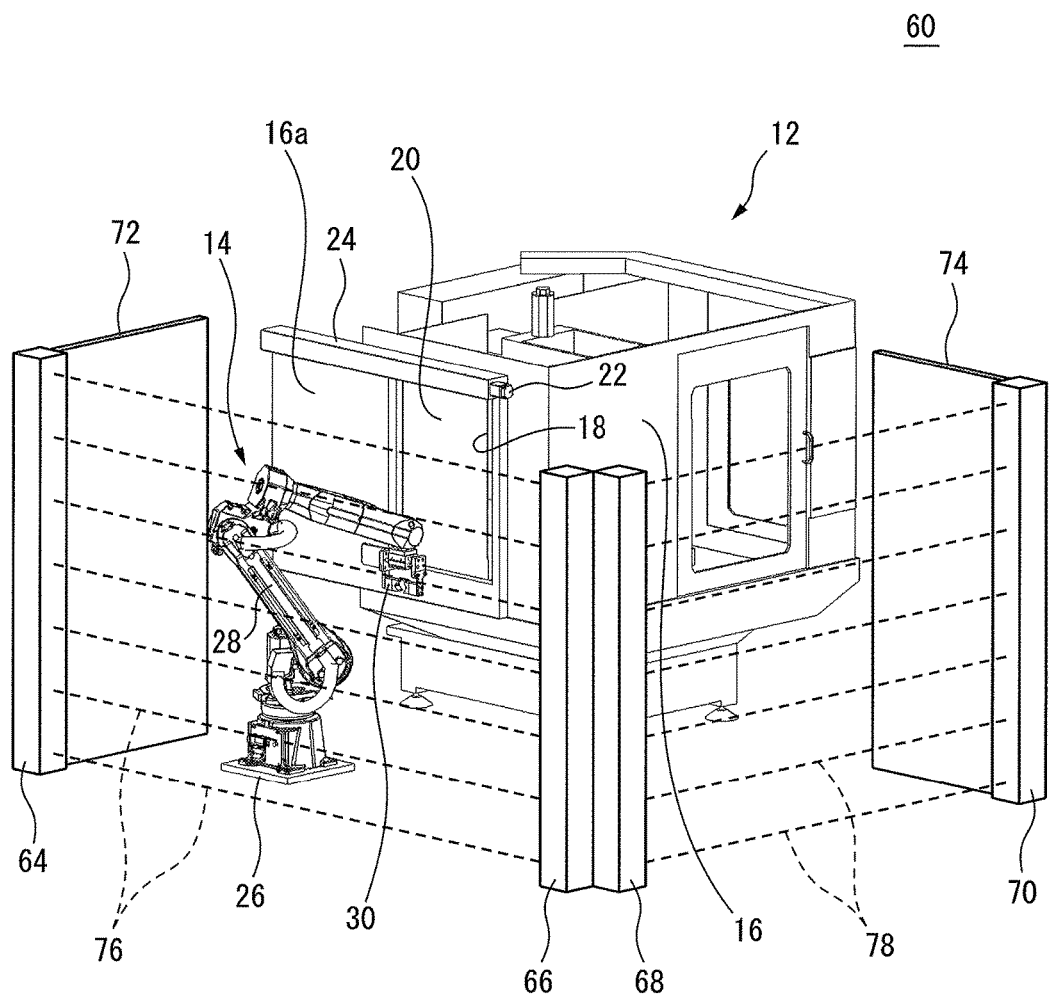
FIG. 5 is a perspective view of a system according to still another embodiment of the invention.

Next, referring to FIG. 5 and FIG. 6, a system 60 according to still another embodiment of the invention will be explained. Note that, elements similar to the above-mentioned embodiments will be assigned the same reference numerals, and the detailed explanations thereof will be omitted. The system 60 includes a processing machine 12, robot 14, noncontact sensors 64, 66, 68, and 70, and fences 72 and 74.

Figure 6:
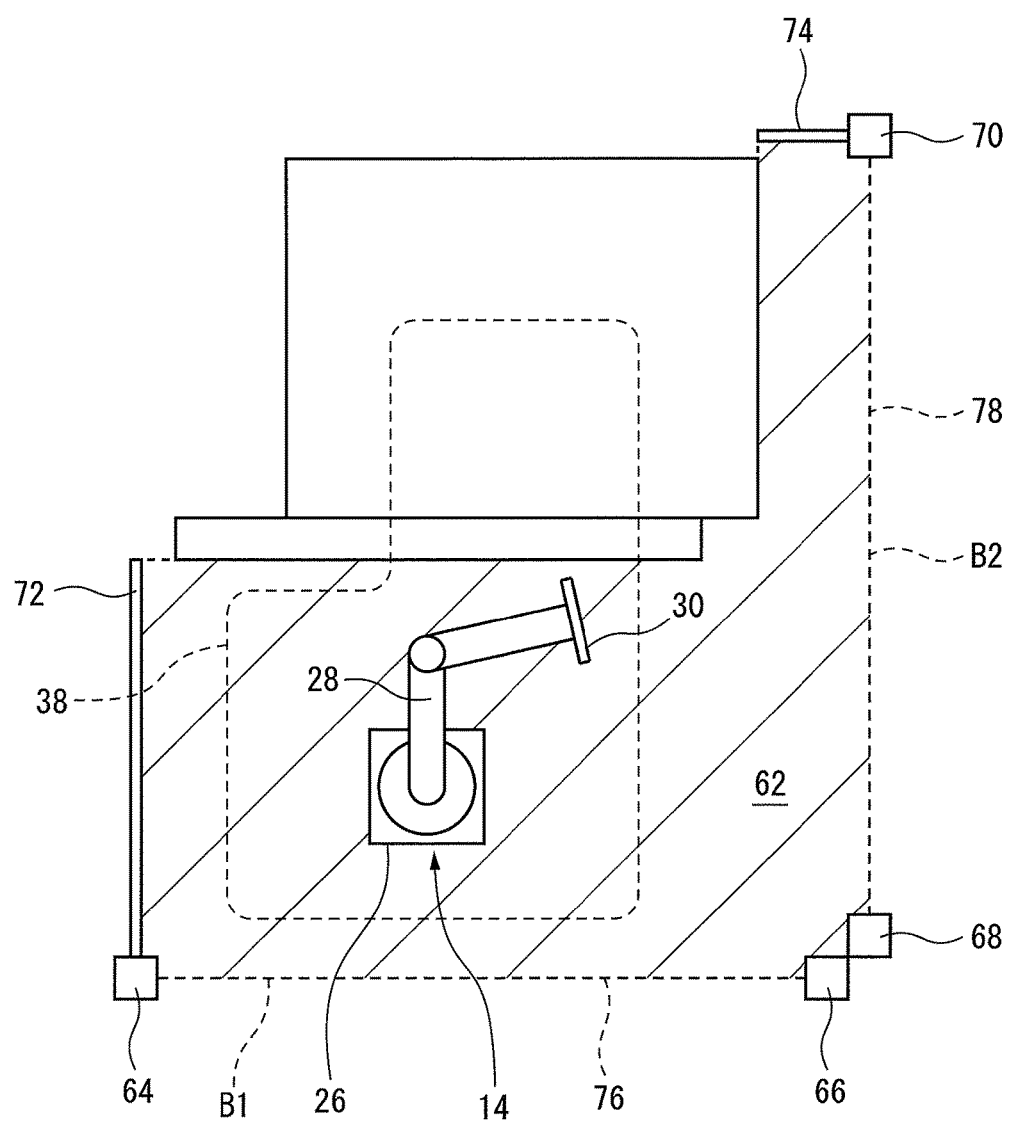
FIG. 6 is a schematic view of the system shown in FIG. 5 as seen from above.

The noncontact sensors 64, 66, 68, and 70 and the fences 72 and 74 define the zone 62 shown by the hatching in FIG. 6. The zone 62 is defined so as to include a part of the motion range 38 of the robot 14. Specifically, the zone 62 is defined so as to include the part of the motion range 38 of the robot 14 other than a part the motion range 38 positioned at the inside of the processing machine 12 (inside from the door 20).

The noncontact sensors 64 and 66 include e.g. a remote sensor (containing a radio wave sensor or an optical sensor) capable of detecting an object by emission of an electromagnetic wave, and emit an electromagnetic wave 76 between the noncontact sensors 64 and 66. A virtual boundary line B1 of the zone 62 (FIG. 6) is defined in conformity with the propagation path of the electromagnetic wave 76. The noncontact sensors 64 and 66 can detect whether an object (including e.g. a hand, foot, or body of the user) has crossed the electromagnetic wave 76 (i.e., the boundary line B1).

Similarly, the noncontact sensors 68 and 70 include e.g. a remote sensor and emit an electromagnetic wave 78 between the noncontact sensors 68 and 70. One virtual boundary line B3 of the zone 62 (FIG. 6) is defined in conformity with the propagation path of the electromagnetic wave 78. The noncontact sensors 68 and 70 can detect whether an object has crossed the electromagnetic wave 78 (i.e., boundary line B2).

On the other hand, the fence 72 is provided so as to extend between the noncontact sensor 64 and the opening surface 16a of the cover 16, and defines one side of the boundary lines of the zone 62. Similarly, the fence 74 is provided so as to extend between the noncontact sensor 70 and a side wall of the cover 16, and defines one side of the boundary lines of the zone 62.

Thus, in the present embodiment, the zone 62 is defined by the noncontact sensors 64, 66, 68, and 70 and the fences 72 and 74. Further, the noncontact sensors 64, 66, 68, and 70 can detect that an object has crossed the boundary lines B1 and B2 in a noncontact manner, when the object crosses the boundary lines B1 and B2 of the zone 62.

Next, referring to FIG. 7, a block diagram of the system 60 will be explained. The system 60 includes a processing machine controller 80 which transmits a control signal to the processing machine actuator 42 so as to control the processing machine 12; and a robot controller 82 which transmits a control signal to the robot actuator 46 so as to control the robot 14. The processing machine controller 80 and the robot controller 82 are connected so as to be able to communicate with each other.

The robot controller 82 includes a CPU; a memory comprised of a RAM etc.; and a servo amplifier. The robot controller 82 sends the command to the robot actuator 46 to operate the robot 14. The processing machine controller 80 includes a CPU; a memory comprised of a RAM etc.; and a servo amplifier. The processing machine controller 80 sends a command to the processing machine actuator 42 to operate the processing machine 12.

In the present embodiment, the processing machine controller 80 has a function of a door controller 84 which controls the servo motor 22 for moving the door 20. Similar to the above-mentioned embodiment, the memory built in the processing machine controller 80 pre-records a first command value. When opening/closing the door 20 at the first speed, the processing machine controller 80 transmits a first command value to the servo motor 22. The servo motor 22 rotates the output shaft by a rotation speed in accordance with the first command value, and moves the door 20 to open/close via the open/close mechanism 24 at the first speed.

The processing machine controller 80 is electrically connected to the noncontact sensors 64, 66, 68, and 70. The noncontact sensors 64, 66, 68, and 70 transmit a boundary crossing signal to the processing machine controller 80 when an object crosses the boundary line B1 and/or B2 of the zone 62. The processing machine controller 80 determines whether the user has entered the zone 62 based on the boundary crossing signal received from the noncontact sensors 64, 66, 68, and 70.

An example for determining entry of the user by the processing machine controller 80 will be explained below. As a first example, the system 60 may include an exit button arranged at the outside of the zone 62. In this first example, when the object crosses the boundary line B1 and/or B2 after the system 60 receives an operation command from the user so as to start the operation of the processing machine 12, the corresponding noncontact sensors 64, 66, 68, and 70 transmit the first boundary crossing signal to the processing machine controller 80.

The processing machine controller 80 determines that the user has entered the zone 62 when receiving the first boundary crossing signal, and then changes the command value to be transmitted to the servo motor 22 from the first command value to the second command value. The processing machine controller 80 transmits the second command value to the servo motor 22 after receiving the first boundary crossing signal, whereby the servo motor 22 moves the door 20 to open/close via the open/close mechanism 24 at a second speed in accordance with the second command value.

Then, if the user pushes the exit button provided at the outside of the zone 62, the processing machine controller 80 receives a signal from the exit button and determines that the user has exited from the zone 62. Then, the processing machine controller 80 changes the command value for driving the servo motor 22 from the second command value to the first command value, and moves the door 20 to open/close at the first speed. In this way, the door 20 is opened/closed at a second speed lower than the first speed from when it is detected that an object has crossed the boundary line B1 and/or B2 to when the user pushes the exit button.

Alternatively, as a second example, the processing machine controller 80 may determine whether the user has entered the zone 62 based on the number of times an object crosses the boundary line B1 and/or B2. In this second example, when an object crosses the boundary line B1 and/or B2 for the first time after the system 60 receives an operation command from the user so as to start the operation of the processing machine 12, the corresponding noncontact sensor 64, 66, 68, or 70 transmits a first boundary crossing signal to the processing machine controller 80.

The processing machine controller 80 determines that the user has entered the zone 62 when receiving the first boundary crossing signal. Then, the processing machine controller 80 changes the command value for driving the servo motor 22 from the first command value to the second command value. When an object crosses the boundary line B1 and/or B2 for the second time, the corresponding noncontact sensor 64, 66, 68, or 70 transmits a second boundary crossing signal to the processing machine controller 80.

When receiving the second boundary crossing signal, the processing machine controller 80 determines that the user has exited from the zone 62. Then, the processing machine controller 80 changes the command value for driving the servo motor 22 from the second command value to the first command value. In this second example, the door 20 is moved to open/close at a second speed lower than the first speed from when an object crosses the boundary line B1 and/or B2 for the first time to when the object crosses the boundary line B1 and/or B2 for the second time.

Thus, in the present embodiment, the processing machine controller 80 determines whether the user has entered the zone 62 based on a boundary crossing signal from the noncontact sensors 64, 66, 68, and 70. Accordingly, the noncontact sensors 64, 66, 68, and 70 function as an entry detection part for detecting the possibility of a person entering the zone 62.

According to the present embodiment, the processing machine controller 80 detects the possibility of the user entering the zone 62 through the noncontact sensors 64, 66, 68, and 70, and decreases the speed of movement of the door 20 when determining that there is the above possibility. Due to this configuration, it is possible to reliably avoid the user being caught in the door 20.

Further, according to the present embodiment, the entry detection part for detecting the possibility of the user entering the zone 62 is configured by the noncontact sensors 64, 66, 68, and 70 capable of detecting that an object has crossed the boundary line B1 and/or B2 in a noncontact manner. Due to this configuration, the possibility of the user entering the zone 62 can be detected by a high precision along a broader boundary line, so it is possible to construct a system more superior in operability.

Figure 7:
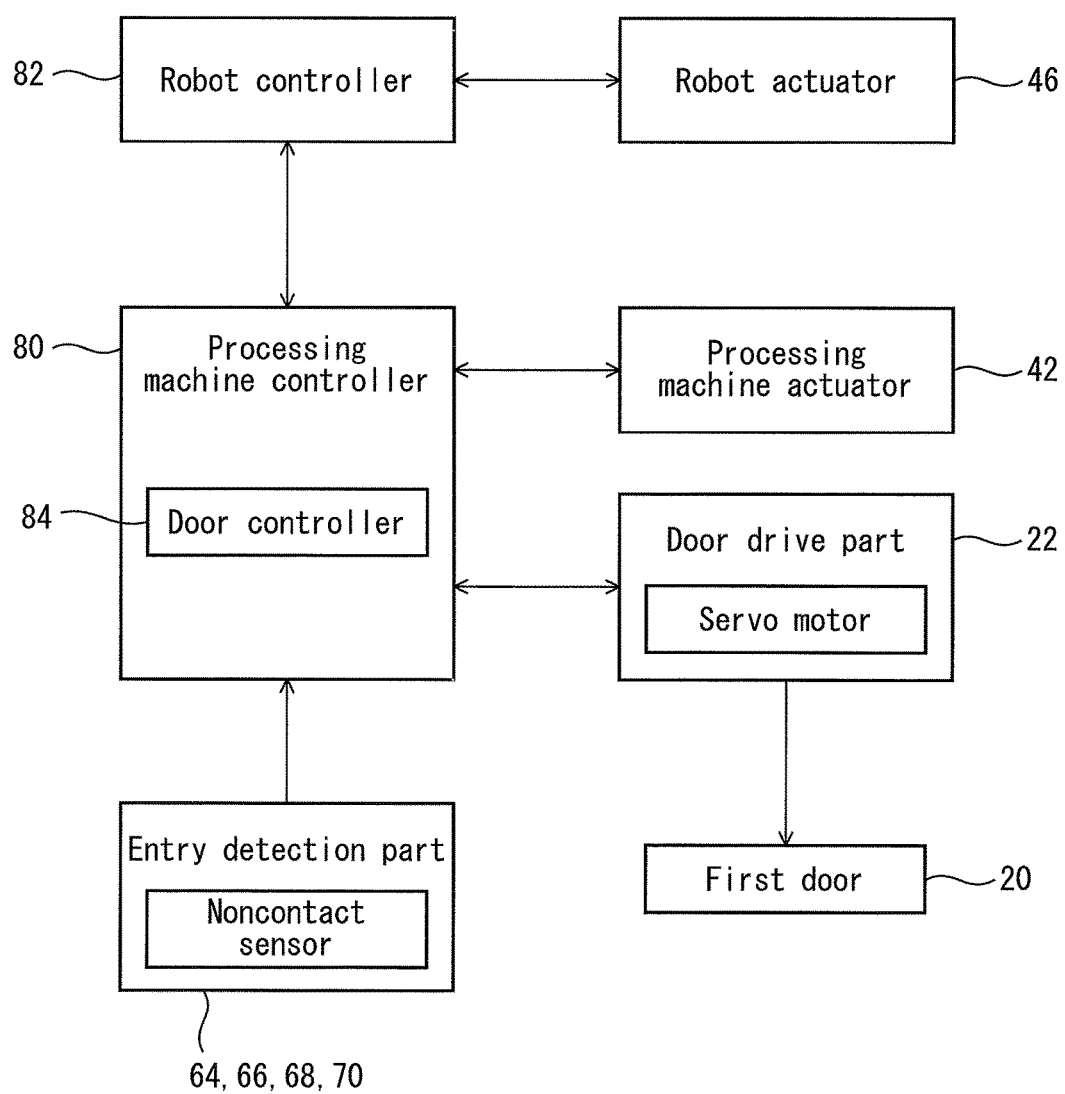
FIG. 7 is a block diagram of the system shown in FIG. 5.

Note that, in the present embodiment, as shown in FIG. 7, the case where the processing machine controller 80 has the function of the door controller 84 was explained. However, the invention is not limited to this. The robot controller 82 may have the function of the door controller 84.

In addition, the processing machine controller 80 may decrease the torque limit value which determines the maximum torque of the servo motor 22 when the possibility of the user entering the zone 62 is detected by the noncontact sensors 64, 66, 68, and 70. Specifically, the processing machine controller 80 changes the torque limit value of the servo motor 22 from the first torque limit value to the second torque limit value smaller than the first torque limit value, when determining that the user has entered the zone 62 based on a boundary crossing signal received from the noncontact sensors 64, 66, 68, and 70.

Further, in the present embodiment, the case where the noncontact sensors 64, 66, 68, and 70 are used as the entry detection part for detecting the possibility of the user entering the zone 62 was explained. However, the invention is not limited to this. An image sensor, such as a CCD sensor or CMOS sensor, can be used as the entry detection part. Alternatively, an electroacoustic transducer, such as a microphone, can be used to detect the entry of the user into the zone 62 by sound wave.

Next, referring to FIG. 8, an example of the operation flow of the system 10, 60 according to the invention will be explained. The flow shown in FIG. 8 is started when the system 10, 60 receives a command for starting operation from the user.

At step S1, the processing machine controller 44, 80 determines whether a person has entered a predetermined zone 36, 62. For example, in the system 10, the processing machine controller 44 determines whether it receives a first door opening signal from the switch 40. When receiving the first door opening signal, the processing machine controller 44 determines that a person has entered the zone 36 and proceeds to step S2. On the other hand, when not receiving the first door opening signal, the processing machine controller 44 determines that a person has not entered the zone 36 and proceeds to step S6.

Further, in the system 60, the processing machine controller 80 determines whether it receives a first boundary crossing signal from the noncontact sensors 64, 66, 68, 70. When receiving the first boundary crossing signal, the processing machine controller 80 determines that a person has entered the zone 62 and proceeds to step S2. On the other hand, when not receiving the first boundary crossing signal, the processing machine controller 80 determines that a person has not entered the zone 62 and proceeds to step S6.

At step S2, the processing machine controller 44, 80 changes the command value for driving the servo motor 22 from the first command value to the second command value. As explained above, the second command value is for driving the servo motor 22 so as to move the door 20 at a lower speed than the first command value.

At step S3, the processing machine controller 44, 80 determines whether the user has exited from the predetermined zone 36, 62. For example, in the system 10, the processing machine controller 44 determines whether it receives a signal from the exit button provided at the outside of the zone 36. When receiving the signal from the exit button, the processing machine controller 44 determines that the user has exited from the zone 36 and proceeds to step S4. On the other hand, when not receiving a signal from the exit button, the processing machine controller 44 determines that the user has not exited from the zone 36 and proceeds to step S7.

Further, in the system 60, the processing machine controller 80 determines whether it receives a second boundary crossing signal from the noncontact sensors 64, 66, 68, 70. When receiving a second boundary crossing signal, the processing machine controller 80 determines that the user has exited from the zone 62 and proceeds to step S4. On the other hand, when not receiving the second boundary crossing signal, the processing machine controller 80 determines that the user has not exited from the zone 62 and proceeds to step S7.

At step S4, the processing machine controller 44, 80 changes the command value for driving the servo motor 22 from the second command value to the first command value. At step S5, the processing machine controller 44, 80 determines whether the processing machine 12 has finished the processing or other work. If determining that the work has been finished, the processing machine controller 44, 80 ends the flow of operation of FIG. 8. On the other hand, if determining that the work has not been finished, the processing machine controller 44, 80 returns to step S1.

If determining that a user has not entered the zone 36, 62 at step S1, at step S6, the processing machine controller 44, 80 determines whether the processing machine 12 has finished the processing or other work. If determining that the work has been finished, the processing machine controller 44, 80 ends the flow of operation. On the other hand, if determining that the work has not been finished, the processing machine controller 44, 80 make the flow to return to step S1.

When determining that the user has not exited from the zone 36, 62 at step S3, at step S7, the processing machine controller 44, 80 determines whether the processing machine 12 has finished the processing or other work. If determining that the work has been finished, the processing machine controller 44, 80 ends the flow of operations. On the other hand, if determining that the work has not been finished, the processing machine controller 44, 80 make the flow to return to step S3.

In the above-mentioned embodiments, the case where the processing machine 12 is a machine tool was explained. However, the invention is not limited to this. The processing machine 12 may also be, for example, a molding machine such as an injection molding machine or a press or any other machine for processing and shaping an object. Further, instead of a processing machine, for example, it is also possible to apply the invention to an assembly machine for assembling parts, a cleaning machine for cleaning an object, a sorting machine for sorting products, a pelletizing machine for pelletizing products and other such work machines.

Further, in the above-mentioned embodiments, the case where the processing machine controller 44, 80 changes the speed of the door 20 from a first speed corresponding to the first command value to a second speed corresponding to the second command value when detecting the possibility of a person entering the zone 36, 62 was explained. However, the invention is not limited to this. The processing machine controller 44, 80 may decrease the speed of movement of the door 20 with a plurality of command values, when detecting the possibility of a person entering the zone 36, 62.

For example, the processing machine controller 44, 80 may gradually reduce the speed of the door 20 from the first speed to the second speed, third speed, . . . n-th speed ("n" is any integer) when detecting the possibility of a person entering the zone 36, 62. In this case, the memory built in the processing machine controller 44, 80 may pre-record a first command value corresponding to the first speed, a second command value corresponding to the second speed, a third command value corresponding to the third speed, . . . and an n-th command value corresponding to the n-th speed.

Above, embodiments of the invention were used to explain the invention, but the above embodiments do not limit the inventions according to the claims. Further, combinations of the features which are explained in the embodiments of the invention may also be included in the technical scope of the invention. However, not all of the combinations of these features are necessarily essential for the solution of the invention. Further, the fact that the above embodiments can be changed or improved in various ways would be clear to a person skilled in the art.

Further, in the claims, description, and drawings, it should be noted that the operations, routines, steps, processes, stages, and other processing may be performed in any order so long as "before", "in advance of", etc. are not especially clearly indicated and, further, the output of prior processing is not used in later processing. In the claims, description, and drawings, even if for convenience "first", "next", "then" etc. are used for explanation for the operational flow, this does not mean that performance in that order is essential.

The invention claimed is:

1. A system comprising:
a work machine including an openable machine door;
a machine door drive part which opens and closes the machine door;
a machine door controller controlling the machine door drive part;
a robot provided so that at least a part of the robot can enter and retract from the inside of the work machine when the machine door is opened;
an entry detection part which detects whether a person has entered a predetermined zone or has opened a zone door that stops the person from entering the predetermined zone when closed, the predetermined zone including a motion range of the robot; and an exit determination part which determines whether the person has exited from the predetermined zone based on a signal from the entry detection part or from an exit-notifying button arranged outside of the predetermined zone, wherein when the entry detection part detects that the person has entered the predetermined zone or has opened the zone door, the machine door controller changes a command value, which is to be sent to the machine door drive part and which determines a speed of movement of the machine door, to a second command value for decreasing the speed of movement, and wherein only when the exit determination part determines that the person has exited from the predetermined zone, the machine door controller changes the command value to a first command value for increasing the speed of movement.

2. The system according to claim 1, wherein the door drive part includes an electric motor, when the entry detection part detects that the person has entered or gained access to the zone, the door controller changes a torque limit value, which determines a maximum torque of the electric motor, to a second torque limit value for decreasing the maximum torque.

3. The system according to claim 2, wherein the electric motor is a servo motor.

4. The system according to claim 1, further comprising a fence which defines the predetermined zone, and at least a part of the fence which can be opened and closed, wherein the entry detection part includes a switch detecting whether the at least a part of the fence has been opened, and wherein the door controller changes the command value to the second command value when the switch detects that the at least a part of the fence has been opened.

5. The system according to claim 1, wherein the entry detection part includes a noncontact sensor detecting whether an object crosses a boundary line which defines the predetermined zone, and wherein the door controller changes the command value to the second command value when the noncontact sensor detects that the object has crossed the boundary line.

* * * * *